(12) United States Patent
Last et al.

(10) Patent No.: US 12,210,207 B2
(45) Date of Patent: Jan. 28, 2025

(54) LENS RETAINER RING WITH COMPLIANT ELEMENT

(71) Applicant: Waymo LLC, Mountain View, CA (US)

(72) Inventors: Matthew Last, San Jose, CA (US);
John Henrie, Los Altos, CA (US);
Chandra Kakani, Fremont, CA (US);
Ralph Shepard, Menlo Park, CA (US);
Drew Ulrich, San Francisco, CA (US)

(73) Assignee: Waymo LLC, Mountain View, CA (US)

(*) Notice: Subject to any disclaimer, the term of this patent is extended or adjusted under 35 U.S.C. 154(b) by 0 days.

(21) Appl. No.: 17/841,010

(22) Filed: Jun. 15, 2022

(65) Prior Publication Data
US 2022/0308305 A1 Sep. 29, 2022

Related U.S. Application Data

(63) Continuation of application No. 16/586,144, filed on Sep. 27, 2019, now Pat. No. 11,402,602.

(51) Int. Cl.
*G02B 7/02* (2021.01)

(52) U.S. Cl.
CPC .......... *G02B 7/026* (2013.01); *G02B 7/021* (2013.01); *G02B 7/028* (2013.01)

(58) Field of Classification Search
CPC ......... G02B 7/021; G02B 7/026; G02B 7/028
USPC .......................................... 359/820, 829–830
See application file for complete search history.

(56) References Cited

U.S. PATENT DOCUMENTS

| 4,433,897 A | 2/1984 | Kojima et al. |
| 4,586,787 A | 5/1986 | Fiandra et al. |
| 4,723,833 A | 2/1988 | Yamada |
| 4,909,599 A | 3/1990 | Hanke et al. |

(Continued)

FOREIGN PATENT DOCUMENTS

| CN | 209313918 U | 8/2019 |
| DE | 102006021796 A1 | 4/2007 |

(Continued)

OTHER PUBLICATIONS

Dymax. "GA-112." Dymax, Jun. 2020, dymax.com/products/formulations/light-curable-materials/gasketing/ga-112 (Year: 2020).

(Continued)

*Primary Examiner* — Zachary W Wilkes
(74) *Attorney, Agent, or Firm* — Botos Churchill IP Law

(57) ABSTRACT

The technology relates to lens assemblies for sensor units that provide a low but consistent preload force over the entire operational temperature range of the device. Consistent preloading helps to avoid cracking and plastic deformation. In particular, a compliant structure of a polymeric material is able to expand and contract across temperature extremes. In addition, the polymeric material is arranged in conjunction with a retainer ring to form a discontinuous seal with the lens. This provides in a leak path that is able to reduce condensation or contaminants. As a result, moisture within the sensor unit is permitted to escape, reducing or eliminating impairments on the lens or other parts of the sensor unit that could otherwise impair device operation.

21 Claims, 10 Drawing Sheets

(56) References Cited

U.S. PATENT DOCUMENTS

| | | | | |
|---|---|---|---|---|
| 5,249,082 | A | * | 9/1993 | Newman ............... G02B 7/028 359/813 |
| 6,394,293 | B1 | | 5/2002 | Hierzer et al. |
| 7,502,183 | B2 | * | 3/2009 | Jao ....................... G02B 7/021 348/340 |
| 7,570,439 | B2 | | 8/2009 | Bogdan et al. |
| 8,456,769 | B2 | | 6/2013 | Teraoka et al. |
| 10,120,079 | B2 | | 11/2018 | Pennecot et al. |
| 2008/0100932 | A1 | | 5/2008 | Noda et al. |
| 2008/0144185 | A1 | | 6/2008 | Wang et al. |
| 2018/0011196 | A1 | * | 1/2018 | Pennecot ............... G01S 7/4813 |
| 2020/0409024 | A1 | * | 12/2020 | Xu ........................ G02B 7/021 |
| 2021/0389546 | A1 | * | 12/2021 | Zhao ..................... G02B 7/026 |

FOREIGN PATENT DOCUMENTS

| | | | | |
|---|---|---|---|---|
| JP | 58043407 | A | * | 3/1983 ............ G02B 7/028 |
| JP | S5997106 | A | | 6/1984 |
| JP | 62089920 | | | 4/1987 |
| JP | H0626365 | A | | 2/1994 |
| JP | 2009053530 | A | | 3/2009 |
| JP | 2009210693 | A | | 9/2009 |
| JP | 2011154249 | A | | 8/2011 |
| JP | 2015045750 | A | | 3/2015 |
| JP | 2015087479 | A | | 5/2015 |
| KR | 20120139219 | A | | 12/2012 |
| KR | 20170004055 | A | | 1/2017 |
| WO | 2018055845 | A1 | | 3/2018 |

OTHER PUBLICATIONS

Dymax. "GA-201." Dymax, Jun. 2020, dymax.com/products/formulations/light-curable-materials/gasketing/ga-201 (Year: 2020).

International Search Report and Written Opinion for Application No. PCT/US2020/052165 dated Feb. 10, 2021.

Office Action issued in corresponding Japanese Patent Application No. 2022-516197, mailed May 2, 2023, 7 pages.

Notice of Allowance issued in corresponding Japanese Patent Application No. 2022-516197, mailed Oct. 19, 2023, 5 pages.

The Extended European Search Report for European Patent Application No. 20870347.0, Oct. 17, 2023, 46 Pages.

* cited by examiner

200

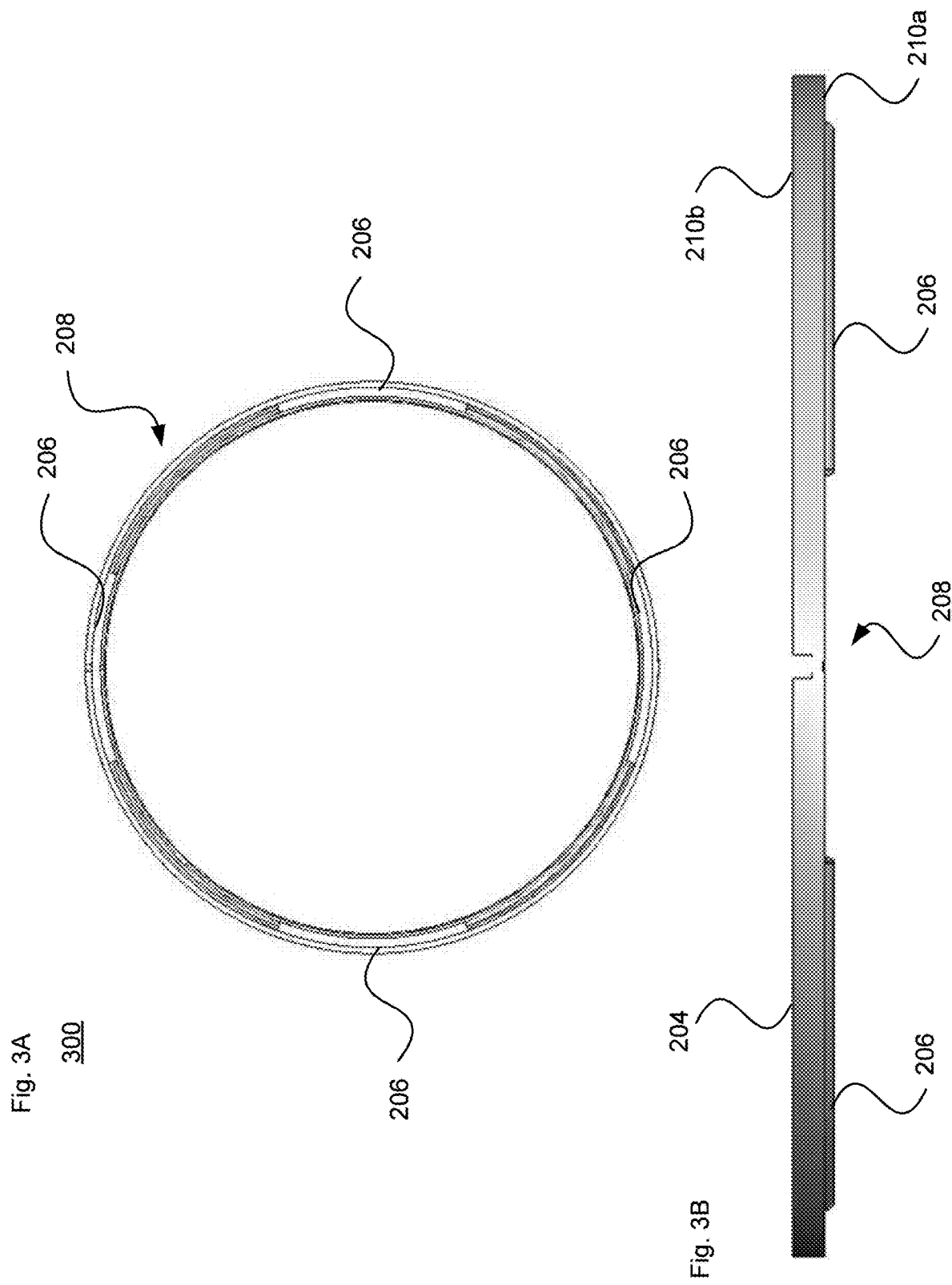

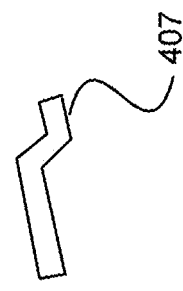

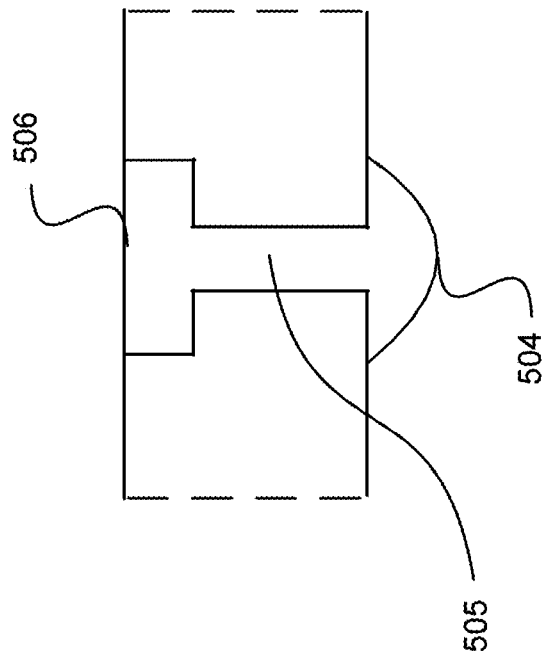
Fig. 5B (A-A view)
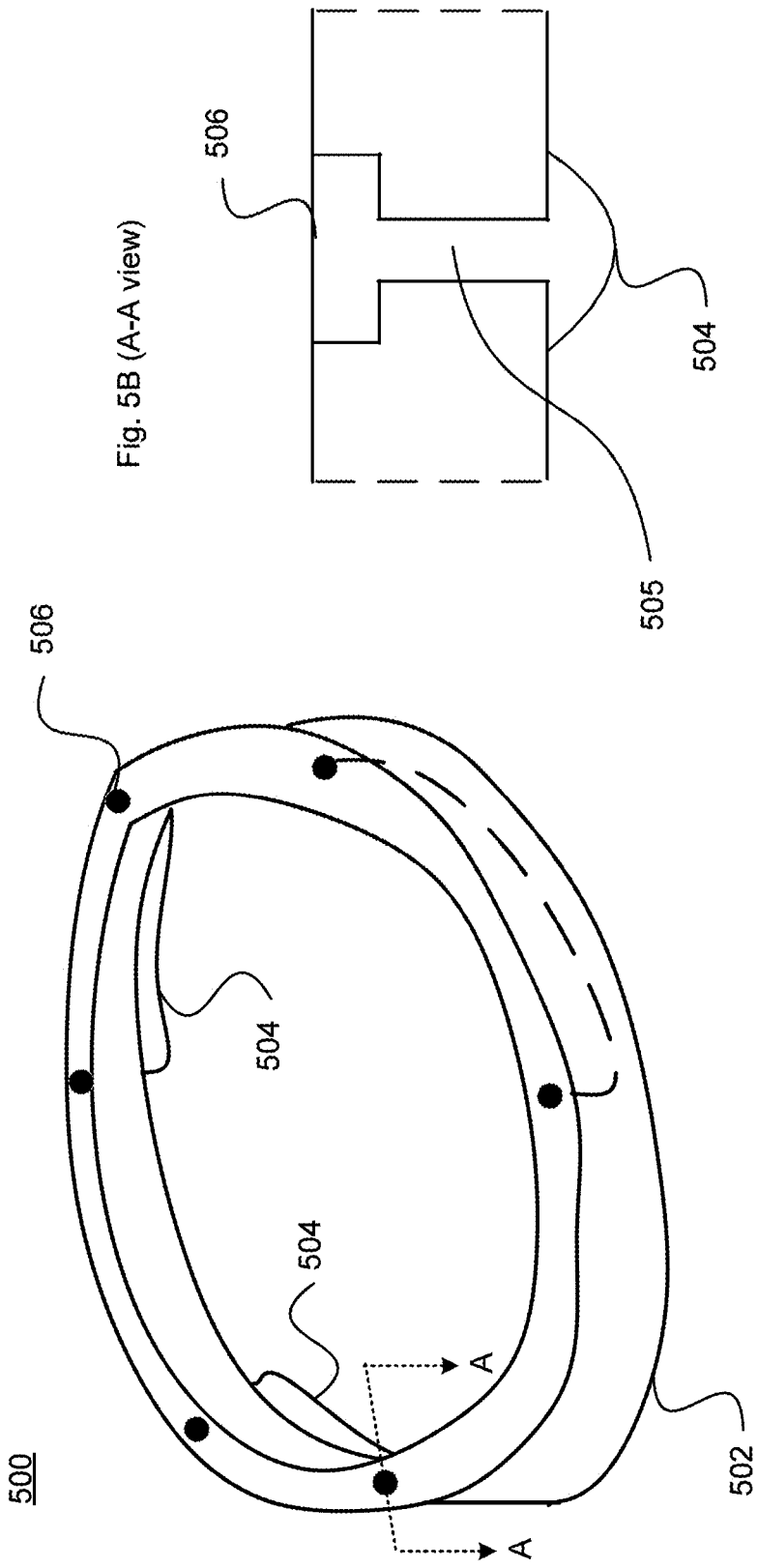
Fig. 5A
500

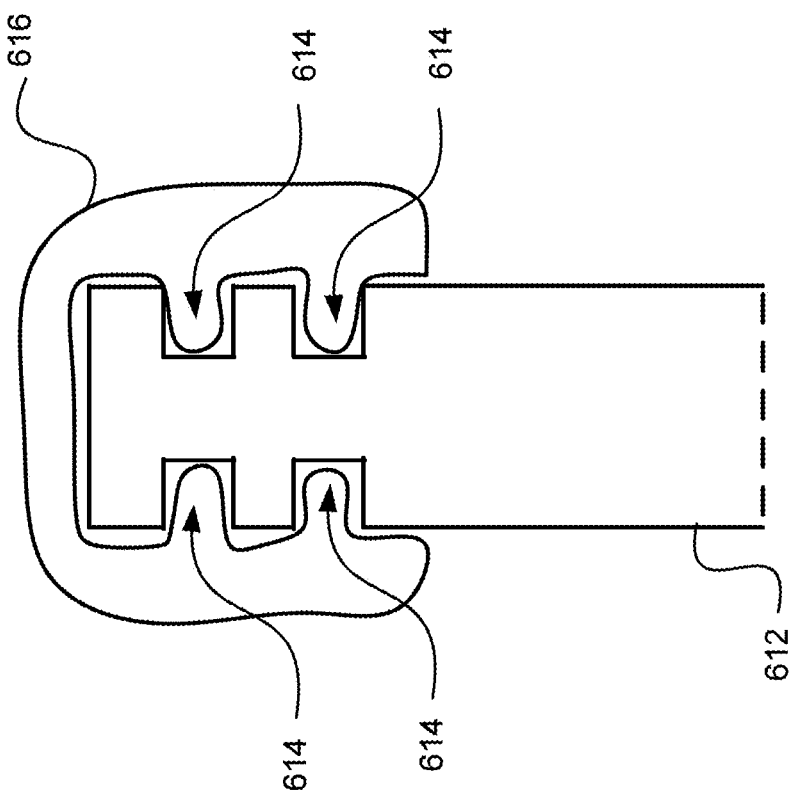
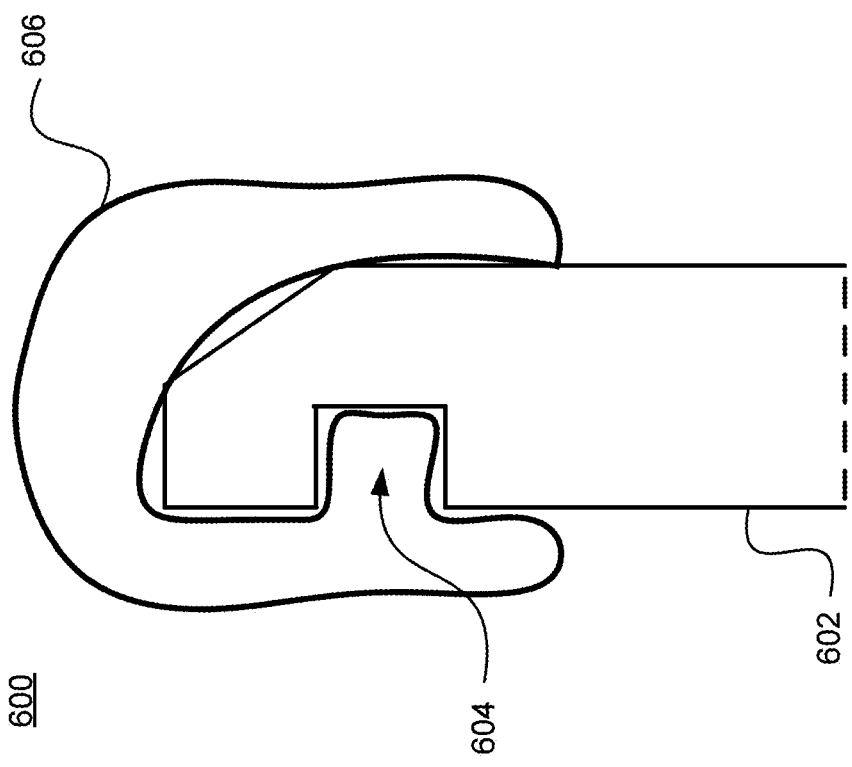

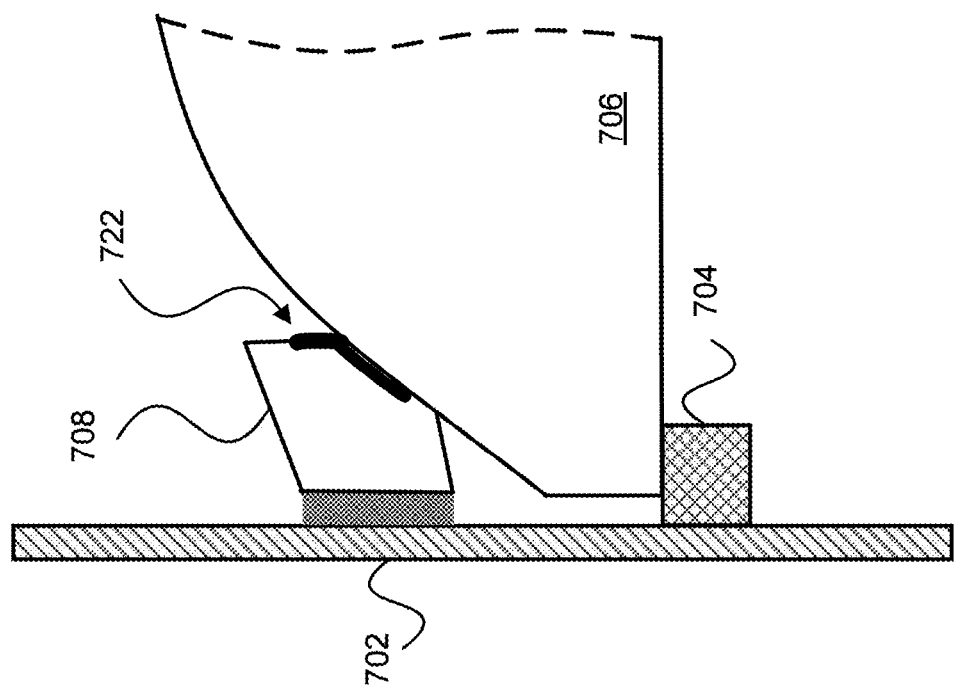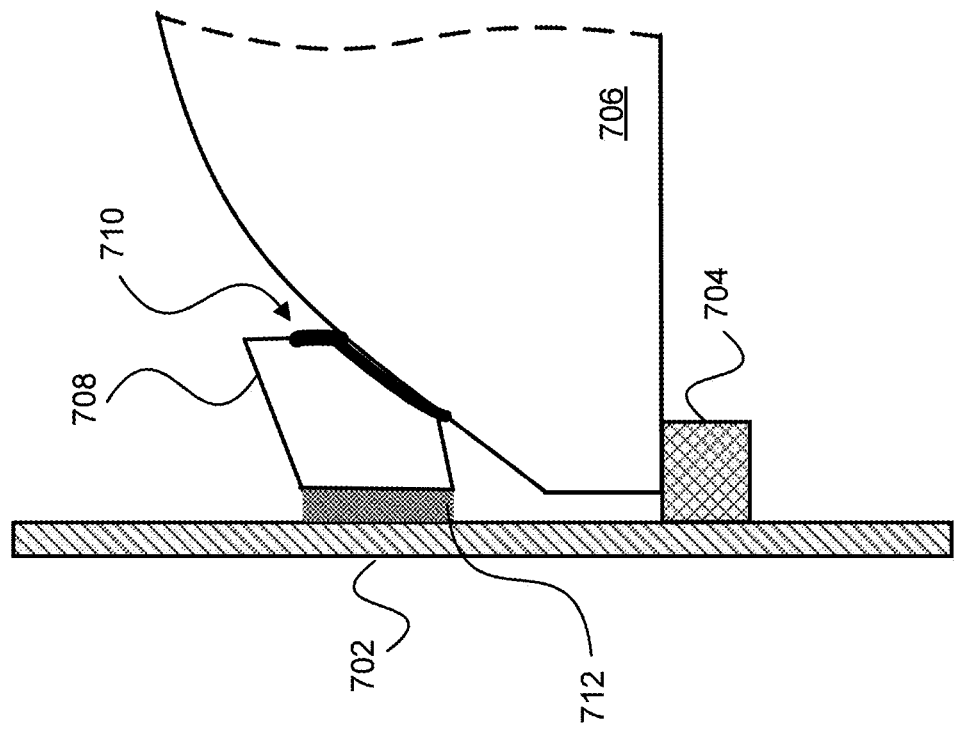

LENS RETAINER RING WITH COMPLIANT ELEMENT

CROSS REFERENCE TO RELATED APPLICATIONS

The present application is a continuation of U.S. patent application Ser. No. 16/586,144, filed Sep. 27, 2019, the entire disclosure of which is incorporated herein by reference.

BACKGROUND

Lenses are used in a wide variety of sensors, including cameras and lidars. Such lenses may operate over extended temperature ranges, for instance from below freezing (e.g., at least as low as −20° F.) to very hot (e.g., exceeding 120° F.). In some configurations, aluminum or another metal may be used as a retainer ring to hold one or more lenses in the sensor's housing. However, due to differences in rates of thermal expansion based on the coefficients of thermal expansion (CTE) of the different materials, at very high temperatures a gap can form between the aluminum retaining ring and the lens elements it holds. And at very low temperatures, excessive stress can build between the aluminum retaining ring and the glass lens elements, which can result in cracking of the lens element and/or plastic deformation of the aluminum.

One approach to maintain a preload force on the lens so that it remains in place is to use one or more compliant O-rings. However, O-rings have their own limitations. For instance, lens assemblies with O-rings can be difficult or time-consuming to assemble. This is a significant concern if many (e.g., tens of thousands) of sensors need to be assembled or otherwise mass produced. Also, O-rings can form a seal that prevents the passage of air through the lens assembly. As a result, moisture or contaminants can accumulate on or near the lens, which may degrade sensor performance. This can be particularly problematic when the sensor is used in a safety-critical setting, where reduction in stray light or image sharpness performance can cause the sensor to operate with reduced effectiveness.

BRIEF SUMMARY

The technology relates to lens assemblies for sensors that provide a low but consistent preload force over the entire operational temperature range of the device. This can avoid cracking and plastic deformation issues that may occur in other approaches. In particular, a compliant structure is provided that is able to expand and contract across temperature extremes. In addition, the compliant structure provides a leak path to reduce condensation or contaminants via a discontinuous seal configuration.

According to one aspect of the technology, a sensor assembly is provided. The sensor assembly comprises a lens, a housing member and a retainer assembly. The housing member receives a first portion of the lens along a first section of the housing member.

The retainer assembly is arranged in direct contact with a second portion of the lens to secure the lens in the sensor assembly. The retainer assembly includes a retainer ring and a polymeric material coupled thereto. The retainer ring is removably affixed to a second section of the housing member. The polymeric material is in direct contact with a plurality of sections of the second portion of the lens.

The polymeric material thus forms a discontinuous seal with the lens. Furthermore, the polymeric material is selected to maintain elasticity over a selected temperature range.

The selected temperature range may be, e.g., the expected operating range for the sensor assembly. In one example, the selected temperature range is −40° F. to 185° F., or more or less. In other example, this range may vary by 10-20% or more.

The discontinuous seal between the retainer assembly and the lens may be configured to provide a leak path for condensation or contaminants to leave the sensor assembly.

In one scenario, the retainer ring is formed of a metal. For instance, the metal ring may be aluminum By way of example, the aluminum metal ring can be formed by stamping or machining.

The polymeric material may be formed along the retainer ring in different ways. For instance, insert molding or overmolding may be employed.

In one example, the retainer ring does not directly contact the lens. However, in another example, at least a portion of the retainer ring may directly contact a section of the lens.

The polymeric material may be arranged as a plurality of compliant components affixed to discrete portions of the retainer ring. For instance, two, three, four or more compliant components may be formed along or otherwise affixed to different sections of the retainer ring.

The polymeric material may form the discontinuous seal with the lens by providing one or more gaps between sections of the polymeric material.

In one scenario, the lens comprises a plurality of lenses and the retainer assembly comprises a plurality of retainer assemblies. Here, each of the plurality of retainer assemblies secures one of the plurality of lenses to the housing member of the sensor assembly. In this scenario, the plurality of lenses may be configured in a stacked arrangement within the housing member of the sensor assembly.

In one example, the sensor assembly comprises a lidar sensor. In another example, the sensor assembly comprises a camera sensor. In a further example, the sensor assembly includes both a lidar sensor and a camera sensor.

In another aspect of the technology, a sensor housing is provided which includes a sensor assembly as described above. For instance, the sensor assembly may comprise at least one of a lidar sensor and a camera sensor.

In yet another aspect of the technology, a vehicle is provided that includes a sensor assembly as described above. For instance, the sensor assembly may be disposed along a roof, front end, rear end or side panel of the vehicle. The sensor assembly may be used to obtain information about objects in the vehicle's external environment, for example to enable the vehicle to operate in a partially or fully autonomous driving mode.

And according to another aspect of the technology, a method of fabricating a sensor assembly is included. The method comprises providing a retainer ring and providing a compliant component. The compliant component is selected to maintain elasticity over a selected temperature range for operation of the sensor assembly.

The method also includes forming a retainer assembly by fixedly securing the compliant component to the retainer ring. A first portion of a lens is arranged along a first section of a sensor housing.

The method further includes securing the lens to the sensor housing with the retainer assembly by coupling the retainer ring to a second section of the sensor housing so that the compliant component is in direct contact with a plurality of discrete sections of a second portion of the lens. The resultant arrangement is such that the compliant component forms a discontinuous seal with the lens.

In one example, forming the retainer assembly by fixedly securing the compliant component to the retainer ring is performed by insert molding or overmolding the compliant component to the retainer ring.

In another example, securing the lens to the sensor housing with the retainer assembly by coupling the retainer ring to the second section of the sensor housing includes one of threadedly securing, adhesively bonding, or snap fitting the retainer ring to the second section of the sensor housing.

BRIEF DESCRIPTION OF THE DRAWINGS

FIGS. 3A-B illustrate an example retainer assembly in accordance with aspects of the technology.

FIGS. 4A-B illustrates an example arrangement in accordance with aspects of the technology.

FIGS. 5A-B illustrate another example arrangement in accordance with aspects of the technology.

FIGS. 6A-B illustrate examples of overmolding in accordance with aspects of the technology.

FIGS. 7A-B illustrate cutaway views of sensor assemblies in accordance with aspects of the technology.

DETAILED DESCRIPTION

Aspects of the technology involve integration of compliant structures with one or more lens retainer rings for a sensor assembly. The compliant structures, such as molded gaskets, are designed to provide a consistent mechanical preload force over the temperature range specified for the sensor assembly. For instance, the temperature range may be between −40° F.-185° F., or more or less.

The compliant structures also provide a discontinuous seal. This allows for leak paths for gas within the sensor assembly, which by design prevent the retaining rings from forming gas-tight compartments. This allows moisture to escape, reducing or eliminating condensation on the lens(es) or other parts of the sensor assembly that could otherwise impair device operation through scattering and/or refraction of incident light. For instance, moisture accumulation could adversely impact received lidar returns or distort optical images obtained by the sensor assembly.

Figure 1B:
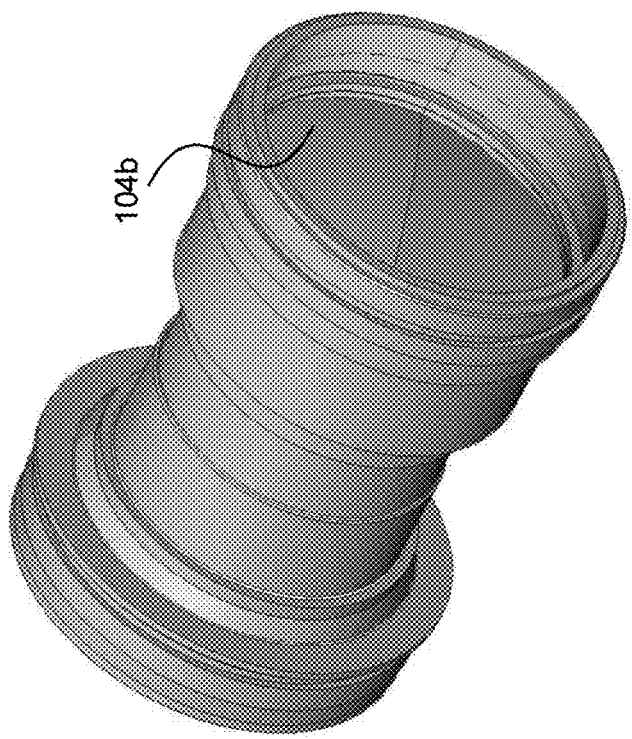
FIGS. 1A-B illustrate an example sensor assembly configured for use with aspects of the technology.
Figure 1A:
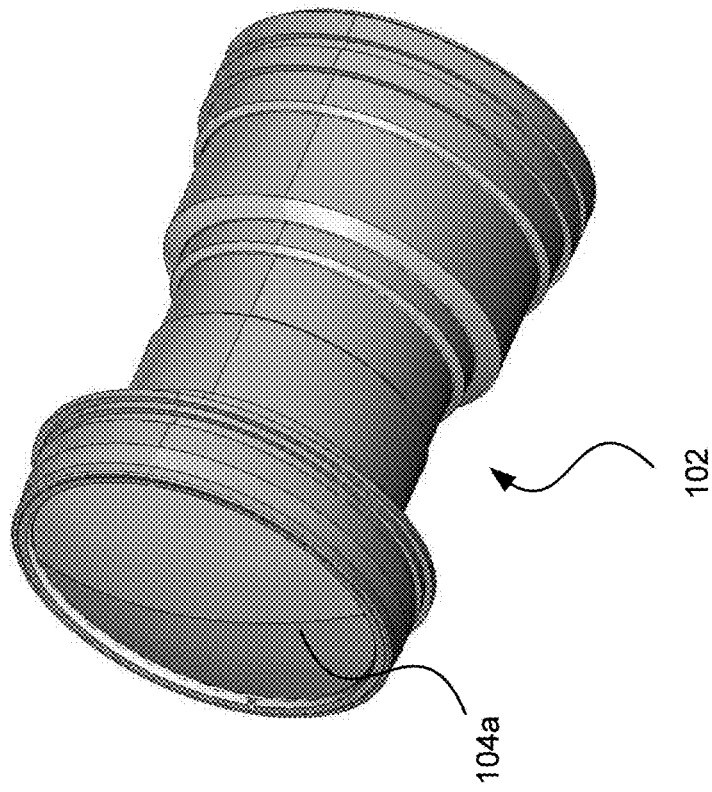

FIGS. 1A-B illustrate front and rear perspective views, respectively, of an exemplary sensor assembly 100. As shown, the assembly 100 has an outer housing 102 and lenses 104a and 104b. While only two lenses are shown, the sensor assembly 100 may include more than two lenses, including one or more other lenses received within the housing 102 between lenses 104a and 104b. Alternatively, the sensor assembly 100 may only include a single lens in another example.

Figure 2B:
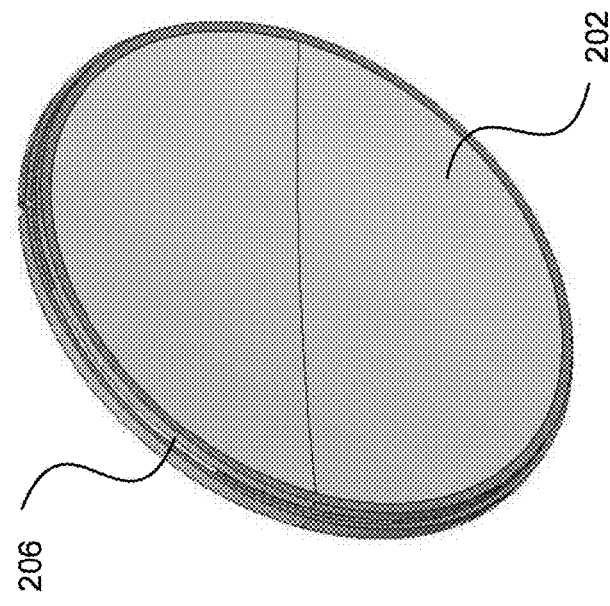
FIGS. 2A-C illustrate an example lens arrangement in accordance with aspects of the technology.
Figure 2A:
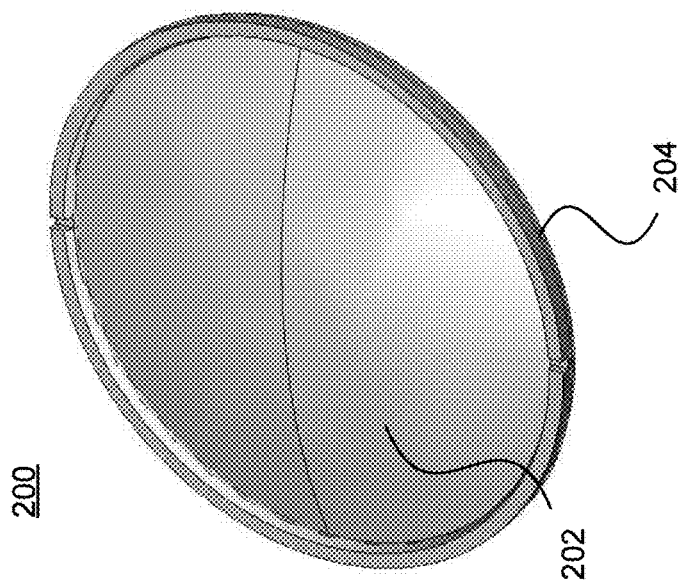
Figure 2C:
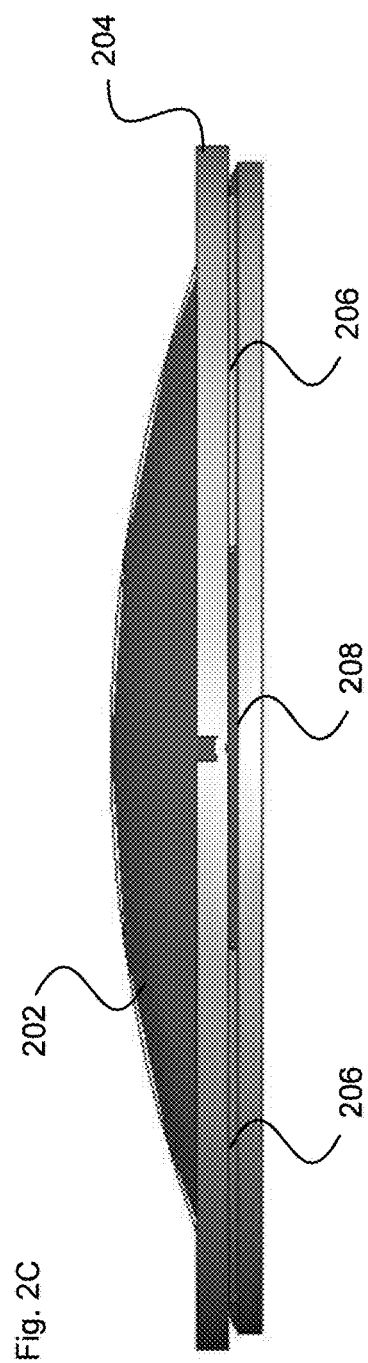

FIGS. 2A-C illustrate a single lens arrangement 200 that includes a lens 202, a circular retainer ring 204 and a plurality of compliant structures 206. In particular, FIG. 2A is a first perspective view showing one side of the lens 202, FIG. 2B is a second perspective view showing the other side of the lens 202, and FIG. 2C is a side view. As can be seen in FIGS. 2B and 2C, a plurality of compliant structures 206 are distributed about the perimeter of the lens 202 along the retainer ring 204. As best seen in FIG. 2C, a gap or other space 208 is formed between adjacent compliant structures 206. According to one aspect, the gap(s) may be smaller than the compliant structures/gaskets. By way of example only, in one implementation the gaskets are on the order of 0.5-1.5 mm across, whereas the gaps are 0.1 mm or smaller. The gap to gasket ratio may vary depending on the area of gasket material to be used in compression. For instance, more gasket material may more effectively reduce potential to creep in the polymer. Alternatively, a gap sufficiently large enough to reliably facilitate a desired gas flow rate could be employed. Here, for instance, a gap as small as twice the polymer bead width may be utilized.

FIGS. 3A-B illustrate a retainer assembly 300 in accordance with FIGS. 2A-C but with the lens 202 omitted. Here, it can be seen that the plurality of compliant structures 206 are equally spaced around the retainer ring 204. As shown in the side view of FIG. 3B, the compliant structures 206 extend from one side 210a of the retainer ring 204, and not from the other side 210b. The side view also clearly shows gap 208 between adjacent compliant structures 206. While four compliant structures are shown in this example, two or more compliant structures may be employed. The compliant structures may be arranged having radial symmetry as shown, but this is not required. Also, the number of gaps and their size can vary. For instance, in the situation where the assembly requires flowing air to maintain some internal condition, more gaps (e.g., six or more) may be included to ensure airflow is distributed as necessary. In one scenario, the compliant structures have the same length and/or shape. In other scenarios the compliant structures may have different configurations. In these scenarios, not all of the gaps need to be the same length. Different configurations can include arrangements to optimize elastic averaging in which slot dimensions are minimized, or arrangements to mimic kinematic coupling in which a minimal set of contact points for compliant structures (e.g., three contact points) are used.

Alternatively, a single compliant component may be provided that covers one side of the retainer ring (e.g., 210a in FIG. 3), but has a plurality of protrusions that result in one or more gaps 208. For example, FIG. 4A illustrates an arrangement 400 with a lens 402, retainer ring 404 and a single compliant component 406 disposed between the lens 402 and the retainer ring 404. As seen in FIG. 4A and the cutaway view of FIG. 4B along the A-A section of FIG. 4A, the compliant component 406 includes one or more protrusions 407 that provide gaps 408.

As shown in these examples, the compliant structures or compliant component (compliant elements) are formed or arranged in conjunction with the retainer ring to create a discontinuous seal. These structure or components may be polymeric materials include resins such as GA-112 and GA-201, both sold by Dymax®, or other thermoplastic, thermoset, UV curable, or humidity curable materials, or any combination thereof. The polymeric material(s) is chosen such that its elasticity is maintained over the temperature range of interest (e.g., −20° F.-185° F.), and such that outgassing is minimized.

The retainer ring may be aluminum, or another metal or other material with a suitable CTE over the temperature range of interest. For instance, the aluminum metal ring may be formed by stamping or machining. The compliant elements may be mechanically bonded with the retainer ring in a manner that creates the discontinuous seal. For instance, one embodiment 500 as illustrated in FIGS. 5A-B may have polymeric members 504 inserted into channels, slots or other segments of a retainer ring 502. As shown in cutaway view 5B along the A-A line of FIG. 5A, here each polymeric member 504 extends through the retainer ring via portion 505 to an opposing end 506. The portion 505 may be the same size or smaller than the opposing end 506. The portion 505 may act as a strengthening member or mechanical bonding feature with the retainer ring. This arrangement may be formed in place, for instance insert molding the polymeric members 504.

In other examples, overmolding, e.g., via a dip process, may be employed. Two such examples are shown in FIGS. 6A and 6B. For instance, in example 600 of FIG. 6A, retainer ring 602 includes an interlock 604, such as a receptacle or a depression. The retainer ring 602 may be dipped in or sprayed with a polymeric material 606, which flows into or otherwise engages with the interlock 604. Here, one or more interlock elements may be formed on one side of the retainer ring 602. Alternatively, as shown in example 610 of FIG. 6B, a series of interlock elements 614 may be formed on both sides of retainer ring 612. Here, the dipped or sprayed polymeric material 616 flows into or otherwise engages with the interlock elements 614.

Once the compliant component(s) are affixed to or otherwise engaged with the retainer ring, this retainer assembly is used to secure the lens to the sensor housing. FIGS. 7A and 7B illustrate two examples. As shown in side cutaway view 700 of FIG. 7A, support element 704 is attached to sidewall 702 of the sensor housing. The support element 704 supports a portion of lens 706, for instance along an edge of one side of the lens 706. The retainer assembly secures the lens within the sensor assembly. As shown, the retainer ring 708 and compliant element(s) 710 are affixed to the sidewall 702 via component 712. The component 712 may be, e.g., an adhesive or a fastener. For instance, component 712 could be one or more threads, adhesive (e.g., applied and cured with preload on the spring), or a snap ring to set a predetermined height. In one example, the retainer ring may be threadedly engaged with the sidewall. In this case, the engagement may be optionally reinforcing with an adhesive. The adhesive may be, e.g., an anaerobic cure threadlocker, a humidity cure Room-Temperature-Vulcanizing (RTV) adhesive, or an ultraviolet plus thermal cure epoxy.

In this example, the retainer ring 708 does not directly touch the lens. In particular, as shown the compliant element is directly in contact with the lens 706, except along the areas where there are gaps between portions of the polymeric material. Here, the retain ring 708 provides a downward force on the polymeric material, which then presses on the lens along selected parts thereof.

FIG. 7B illustrates another example 720. Here, as shown the compliant element(s) 722 are disposed between a portion of the retainer ring 708 and the lens 706, but at least a part of the retainer ring 708 also directly contacts the lens. In this arrangement, the direct contact of the retainer ring on the lens can guarantee a maximum compression ratio for the polymer of the compliant element(s). This could be beneficial if the goal is only to maintain a particular minimum preload at elevated temperature, but when the maximum stress at low temperatures is not enough to damage the lens. Such an arrangement may also help prevent cracking/flow of the polymer.

Figure 8:
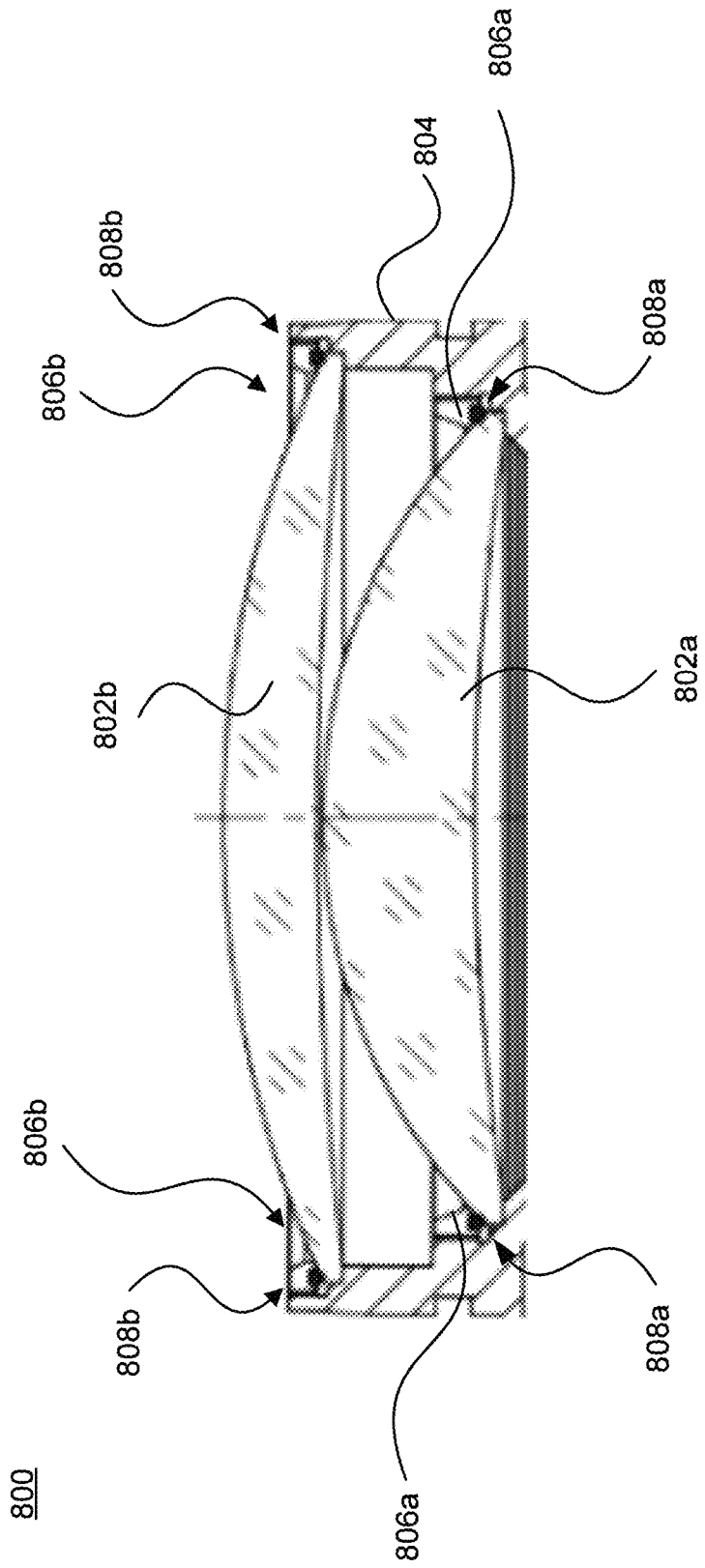
FIG. 8 illustrates a dual lens configuration in accordance with aspects of the technology.

As noted above, multiple lens assemblies may be used in one sensor assembly. FIG. 8 illustrates one example 800, in which a pair of lenses 802a and 802b are received within housing 804. In this example, each lens 802 has its own retainer ring 806a or 806b, respectively. A set of compliant elements 808a is integrated with retainer ring 806a to secure lens 802a to the housing 804. Similarly, a set of compliant elements 808b is integrated with retainer ring 806b to secure lens 802b to the housing 804. While only two lens assemblies are shown, any number of lens assemblies may be employed as part of one sensor assembly. Furthermore, sensor assemblies in accordance with these aspects of the technology may include lidar sensors and cameras such as optical and/or infrared sensors. These sensor assemblies may be used with self-driving vehicles, such as partially or fully autonomous self-driving cars, trucks, busses, motorcycles, farm equipment or the like. The sensor assemblies and the variations described above are not limited to these types of systems. For instance, they may also be used in mobile robots, facility security, traffic flow optimization, and other applications outside those involving self-driving vehicles.

Figure 9:
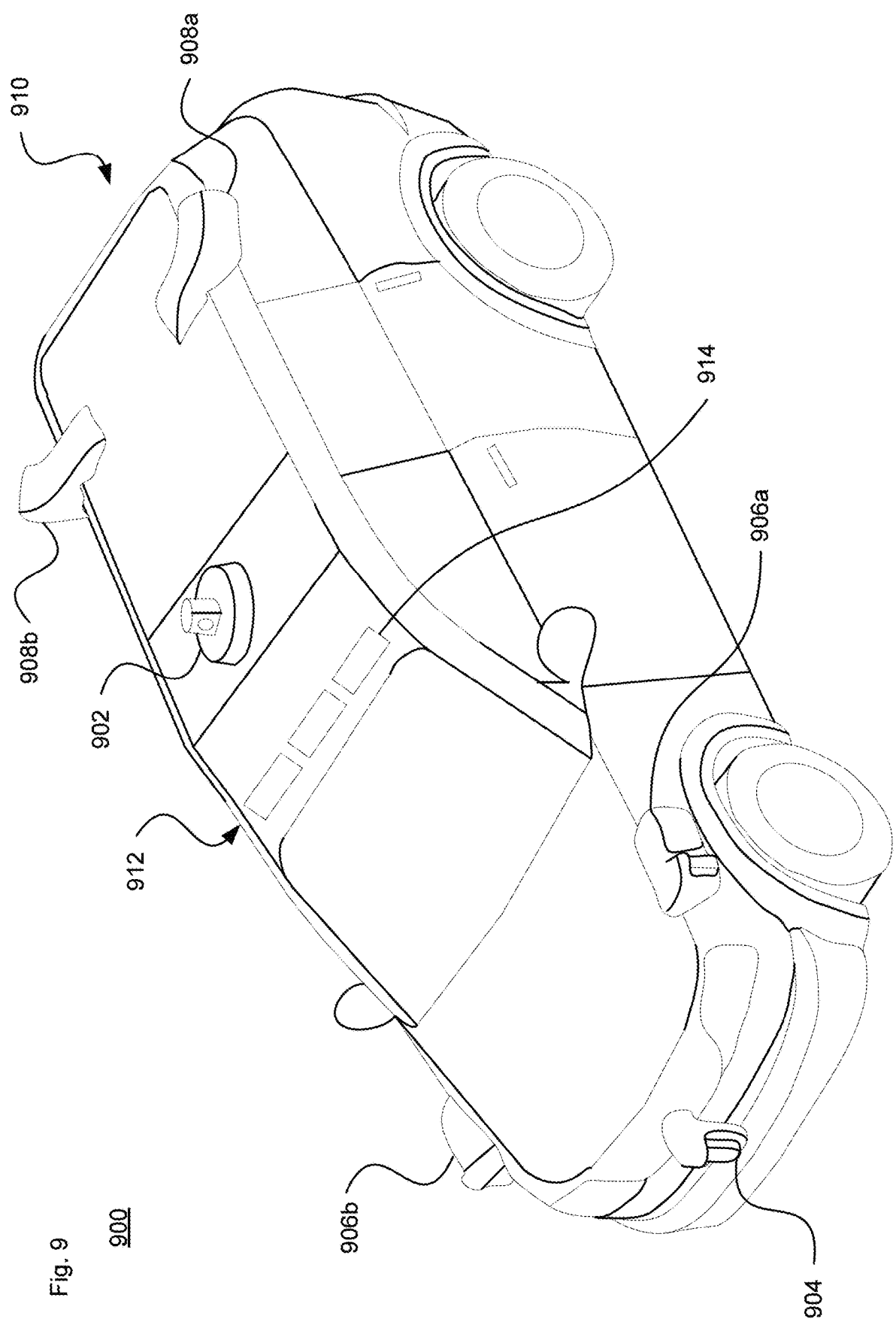
FIG. 9 illustrates an example vehicle for use with aspects of the technology.

FIG. 9 illustrates an example of a vehicle 900 having one or more sensors assemblies as described above. In particular, this example provides a perspective view of a passenger vehicle, such as a minivan, sport utility vehicle (SUV) or other vehicle. The passenger vehicle 900 may include various sensors for obtaining information about the vehicle's external environment. For instance, a roof-top housing 902 may include a lidar sensor as well as various cameras, radar units, infrared and/or acoustical sensors. Housing 904, located at the front end of vehicle 900, and housings 906a, 906b on the driver's and passenger's sides of the vehicle may each incorporate lidar, radar, camera and/or other sensors. For example, housing 906a may be located in front of the driver's side door along a quarter panel of the vehicle. As shown, the passenger vehicle 900 also includes housings 908a, 908b for radar units, lidar and/or cameras also located towards the rear roof portion of the vehicle. Additional lidar, radar units and/or cameras (not shown) may be located at other places along the vehicle 900. For instance, arrow 910 indicates that a sensor unit may be positioned along the rear of the vehicle 900, such as on or adjacent to the bumper. And arrow 912 indicates a series of sensor units 914 arranged along a forward-facing direction of the vehicle. Any or all of the housings may include one or more sensor assemblies such as described above. For instance, a pair of lidar or camera sensor assemblies may be incorporated into any of housings 902, 904, 906a or 906b, 908a or 908b, or 914. The vehicle 900 may sue the one or more sensor assemblies to obtain information about objects in the vehicle's external environment, and use this information to operate in a partially or fully autonomous self-driving mode.

Figure 10:
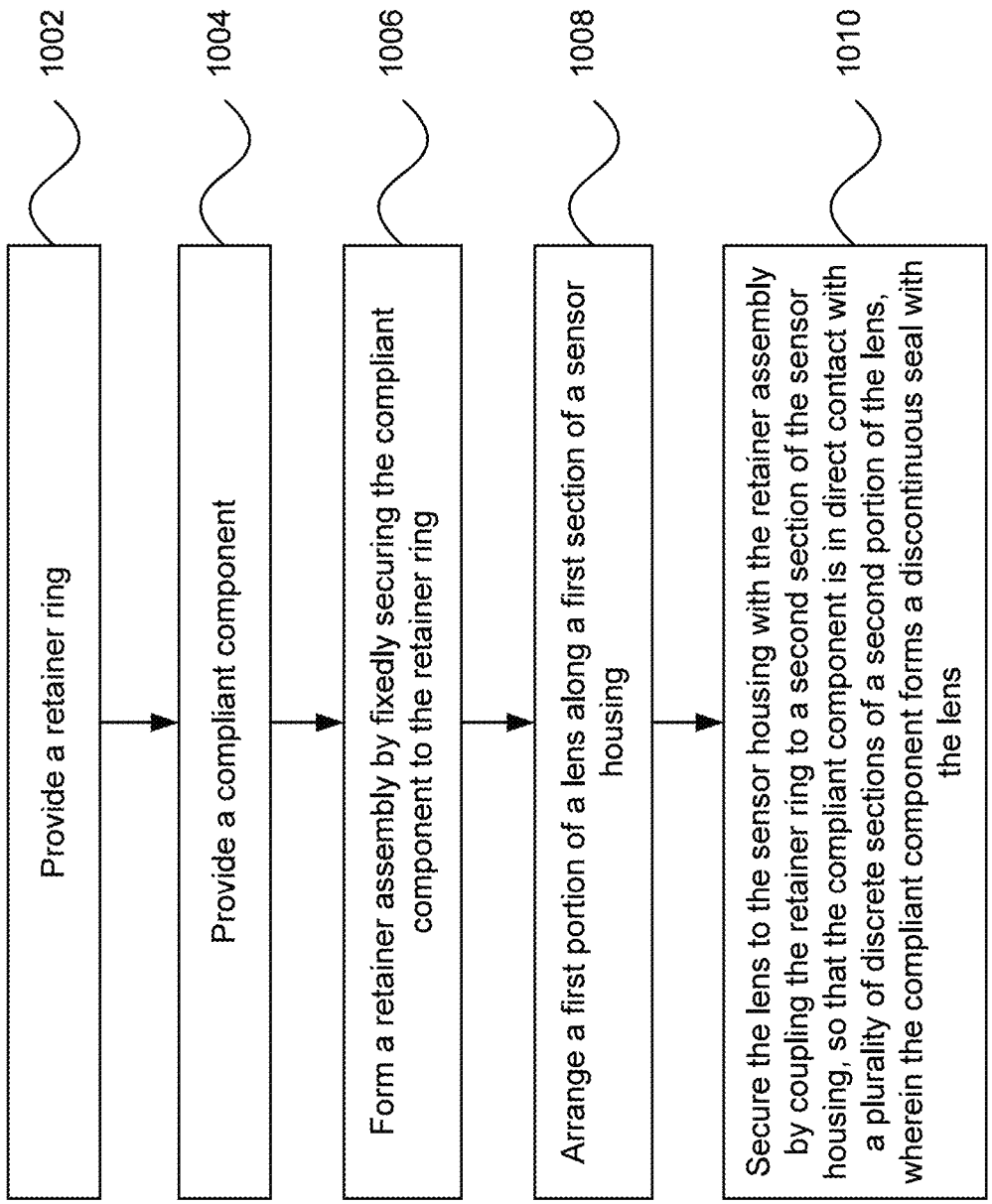
FIG. 10 illustrates a method of fabrication of a sensor assembly in accordance with aspects of the technology.

FIG. 10 illustrates a method of fabricating a sensor assembly in view of the configurations described above. As shown at block 1002 a retainer ring is provided, and as shown at block 1004 a compliant component is provided. The compliant component such as a polymeric material, is selected to maintain elasticity over a selected temperature range for operation of the sensor assembly.

For instance, the selected temperature range may be on the order of −40° F. to 185° F., or more or less. The provided retainer ring may be a metal, such as aluminum. By way of example, the aluminum metal ring may be formed by stamping or machining.

At block 1006, the method includes forming a retainer assembly by fixedly securing the compliant component to the retainer ring. This can be done by insert molding or overmolding the compliant component to the retainer ring as described above.

At block 1008, a first portion of a lens is arranged along a first section of a sensor housing, for instance by placing it via hand or machine (e.g., a robotic arm or other device). Then, at block 1010, the lens is secured to the sensor housing with the retainer assembly by coupling the retainer ring to a second section of the sensor housing so that the compliant component is in direct contact with a plurality of discrete sections of a second portion of the lens. Examples of this are shown in FIGS. 7A-B, which are described above. For instance, securing the lens to the sensor housing with the retainer assembly by coupling the retainer ring to the second section of the sensor housing may include one of threadedly securing, adhesively bonding, or snap fitting the retainer ring to the second section of the sensor housing.

The result is that the compliant component forms a discontinuous seal with the lens. For instance, the discontinuous seal between the retainer assembly and the lens may be able to provide a leak path for condensation or contaminants to leave the sensor assembly.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A sensor assembly comprising:
   a lens;
   a housing including a sidewall;
   a support element affixed to a first section of the sidewall of the housing and receiving a first portion of the lens along a first section thereof; and
   a retainer assembly in direct contact with a second portion of the lens to secure the lens in the sensor assembly, the retainer assembly including a retainer ring and a polymeric material defining an inner circumference and an outer circumference coupled thereto, the retainer ring being removably affixed to a second section of the sidewall, the polymeric material being in direct contact with the second portion of the lens, and the polymeric material being a single component disposed between the lens and the retainer ring;
   wherein the polymeric material has a mechanical preload force and an operational temperature range for operation of the sensor assembly;
   wherein the polymeric material forms a discontinuous seal between the retainer assembly and the lens, the discontinuous seal providing a leak path to avoid formation of a gas-tight compartment within the sensor assembly; and
   wherein the polymeric material includes one or more protrusions that form the discontinuous seal, wherein the one or more protrusions extend radially inward beyond the inner circumference.

2. The sensor assembly of claim 1, wherein the operational temperature range for operation of the sensor assembly is −40° F. to 185° F.

3. The sensor assembly of claim 1, wherein the polymeric material forms the discontinuous seal between the retainer assembly and the lens via one or more gaps between sections of the polymeric material.

4. The sensor assembly of claim 3, wherein the one or more gaps are arranged to have a spacing that is configured to facilitate a gas flow rate.

5. The sensor assembly of claim 1, wherein the polymeric material has an elasticity for operation of the sensor assembly over the operational temperature range.

6. The sensor assembly of claim 1, wherein the leak path provides for condensation or contaminants to leave the sensor assembly to avoid impairing sensor assembly operation through scattering or refraction of incident light.

7. The sensor assembly of claim 1, wherein the retainer ring is metal.

8. The sensor assembly of claim 7, wherein the metal ring is aluminum.

9. The sensor assembly of claim 1, wherein the polymeric material is formed along the retainer ring using insert molding or overmolding.

10. The sensor assembly of claim 1, wherein the retainer ring does not directly contact the lens.

11. The sensor assembly of claim 1, wherein the polymeric material is arranged as a plurality of compliant components affixed to discrete portions of the retainer ring.

12. The sensor assembly of claim 1, wherein:
   the lens comprises a plurality of lenses; and
   the retainer assembly comprises a plurality of retainer assemblies, each of the plurality of retainer assemblies securing one of the plurality of lenses to the housing of the sensor assembly.

13. The sensor assembly of claim 12, wherein the plurality of lenses is configured in a stacked arrangement within the housing of the sensor assembly.

14. The sensor assembly of claim 1, wherein the sensor assembly includes a camera sensor.

15. The sensor assembly of claim 1, wherein the sensor assembly further comprises a lidar sensor.

16. The sensor assembly of claim 1, wherein at least a portion of the one or more protrusions is angled relative to a portion of the polymeric material between the inner circumference and the outer circumference.

17. A vehicle, comprising:
   a front end;
   a rear end;
   a left side panel coupled to the front end and the rear end;
   a right side panel coupled to the front end and the rear end;
   a roof coupled to the left and right side panels; and
   a sensor assembly comprising:
      a lens;
      a housing including a sidewall;
      a support element affixed to a first section of the sidewall of the housing and receiving a first portion of the lens along a first section thereof; and
      a retainer assembly in direct contact with a second portion of the lens to secure the lens in the sensor assembly, the retainer assembly including a retainer ring and a polymeric material defining an inner circumference and an outer circumference coupled thereto, the retainer ring being removably affixed to a second section of the sidewall, the polymeric material being in direct contact with the second portion of the lens, and the polymeric material being a single component disposed between the lens and the retainer ring;

wherein the polymeric material has a mechanical preload force and an operational temperature range for operation of the sensor assembly;

wherein the polymeric material forms a discontinuous seal between the retainer assembly and the lens, the discontinuous seal providing a leak path to avoid formation of a gas-tight compartment within the sensor assembly;

wherein the polymeric material includes one or more protrusions that form the discontinuous seal, wherein the one or more protrusions extend radially inward beyond the inner circumference; and wherein the sensor assembly is disposed along either a perimeter of the vehicle or on the roof of the vehicle.

18. The vehicle of claim 17, wherein the sensor assembly is disposed along the perimeter of the vehicle at one of the front end, the rear end, the left side panel or the right side panel.

19. A method of fabricating a sensor assembly, the method comprising:

forming a retainer assembly by fixedly securing a compliant component to a retainer ring, the compliant component having an elasticity and an operational temperature range for operation of the sensor assembly, and the compliant component being a single component defining an inner circumference and an outer circumference and formed between a lens and the retainer ring;

arranging a first portion of a lens along a first section of a sensor housing; and securing the lens to the sensor housing with the retainer assembly by coupling the retainer ring to a second section of the sensor housing so that the compliant component is in direct contact with a second portion of the lens;

wherein the compliant component forms a discontinuous seal between the retainer assembly and the lens, the discontinuous seal providing a leak path to avoid formation of a gas-tight compartment within the sensor assembly, and wherein the compliant component includes one or more protrusions that form the discontinuous seal, wherein the one or more protrusions extend radially inward beyond the inner circumference.

20. The method of claim 19, wherein forming the retainer assembly by fixedly securing the compliant component to the retainer ring is performed by insert molding or overmolding the compliant component to the retainer ring.

21. The method of claim 19, wherein securing the lens to the sensor housing with the retainer assembly by coupling the retainer ring to the second section of the sensor housing includes one of threadedly securing, adhesively bonding, or snap fitting the retainer ring to the second section of the sensor housing.

* * * * *